(12) United States Patent
Chen et al.

(10) Patent No.: US 8,220,526 B2
(45) Date of Patent: Jul. 17, 2012

(54) METHOD FOR CONTINUIOUS AND EFFICIENT CASTING ROLL OF MAGNESIUM ALLOY PLATE

(75) Inventors: Xuemin Chen, Guangdong (CN); Qingdong Ye, Guangdong (CN); Jianguo Li, Guangdong (CN); Chaowen Liu, Guangdong (CN); Yueming Yu, Guangdong (CN)

(73) Assignee: Shenzhen Sunxing Light Alloys Materials Co., Ltd., Shenzhen, Guangdong (CN)

( * ) Notice: Subject to any disclaimer, the term of this patent is extended or adjusted under 35 U.S.C. 154(b) by 227 days.

(21) Appl. No.: 12/867,202

(22) PCT Filed: May 10, 2010

(86) PCT No.: PCT/CN2010/072579
§ 371 (c)(1),
(2), (4) Date: Aug. 11, 2010

(87) PCT Pub. No.: WO2011/134176
PCT Pub. Date: Nov. 3, 2011

(65) Prior Publication Data
US 2012/0118525 A1    May 17, 2012

(30) Foreign Application Priority Data
Apr. 27, 2010    (CN) .......................... 2010 1 0163654

(51) Int. Cl.
*B22D 11/06*    (2006.01)

(52) U.S. Cl. .......... 164/452; 164/455; 164/480
(58) Field of Classification Search ........... 164/428, 164/429, 437, 440, 452–455, 475, 480, 490
See application file for complete search history.

(56) References Cited

U.S. PATENT DOCUMENTS 7,028,749 B2 * 4/2006 Liang et al. .......... 164/455
7,814,961 B2 * 10/2010 Numano et al. .......... 164/480

FOREIGN PATENT DOCUMENTS
JP      2003340552 A  * 12/2003
* cited by examiner

*Primary Examiner* — Jessica L Ward
*Assistant Examiner* — Kevin E Yoon
(74) *Attorney, Agent, or Firm* — Jackson IPG PLLC

(57) ABSTRACT

A method for continuous and efficient casting roll of magnesium alloy plates including providing plural induction furnaces, resistance furnace, casting roll and rollers; adding metal elements into the induction furnaces, the metal elements comprising Mg ingots or Mg alloy, the metal elements being smelted in the induction furnaces and then flow into the resistance furnace; controlling temperature of the Mg melt in the resistance furnace, wherein there are at least two temperature controlling areas communicated with each other, and a difference of temperatures is constant; transferring the Mg melt into biting area through a transferring pipe and modeling the mg melt into Mg plate, the temperature of the Mg melt into the biting area being 690±10° C.; Rolling the Mg plate in the rollers and each band of the rollers having a working temperature 250~350° C., and the difference of temperature is ±10° C.

15 Claims, 2 Drawing Sheets

METHOD FOR CONTINUOUS AND EFFICIENT CASTING ROLL OF MAGNESIUM ALLOY PLATE

The present invention relates to fields of smelting, deformation and processing shape, and especially to a method for continuous and efficient casting roll of magnesium (Mg) alloy plates.

GENERAL BACKGROUND

Molten Mg and Mg alloy have very active characteristics, and can easily generate oxidative combustion. Molten Mg and Mg alloy can generate violent reactions with nearly all of fire-proof materials having aluminum (Al) alloy, and even cause violent explosions. Therefore, protective measures for safe and reliable production are necessary and indispensable. The molten Mg and Mg alloy are called Mg melt for short.

Conventional fabricating processes of Mg ally plates usually include smelting, temperature controlling, casting roll and etc. During the whole process, protective measures should be fully undertaken. The smelting process has employed a resistance furnace. The temperature controlling process has employed a pair of resistance furnaces to implement pre-process of Mg melt before casting roll. Conventional casting roll are likely to generate breaks and cannot achieve a continuous casting roll at all, and due to a slowly increased temperature of the resistance furnace, the production efficiency is very low.

What is needed, therefore, is a method for continuous and efficient casting roll of magnesium alloy plates that can overcome or mitigate the above-described deficiencies.

SUMMARY

It is an object of the present invention to provide a method for continuous and efficient casting roll of magnesium alloy plates.

One exemplary embodiment of the present invention is a method for continuous and efficient casting roll of magnesium alloy plates including providing plural induction furnaces, resistance furnace, casting roll and rollers; adding metal elements into the induction furnaces, the metal elements comprising Mg ingots or Mg alloy, the metal elements being smelted in the induction furnaces and then flow into the resistance furnace; controlling temperature of the Mg melt in the resistance furnace, wherein there are at least two temperature controlling areas communicated with each other, and a difference of temperatures is constant; transferring the Mg melt into biting area through a transferring pipe and modeling the mg melt into Mg plate, the temperature of the Mg melt into the biting area being 690±10° C.; Rolling the Mg plate in the rollers and each band of the rollers having a working temperature 250~350° C., and the difference of temperature is ±10° C.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Figure 1:
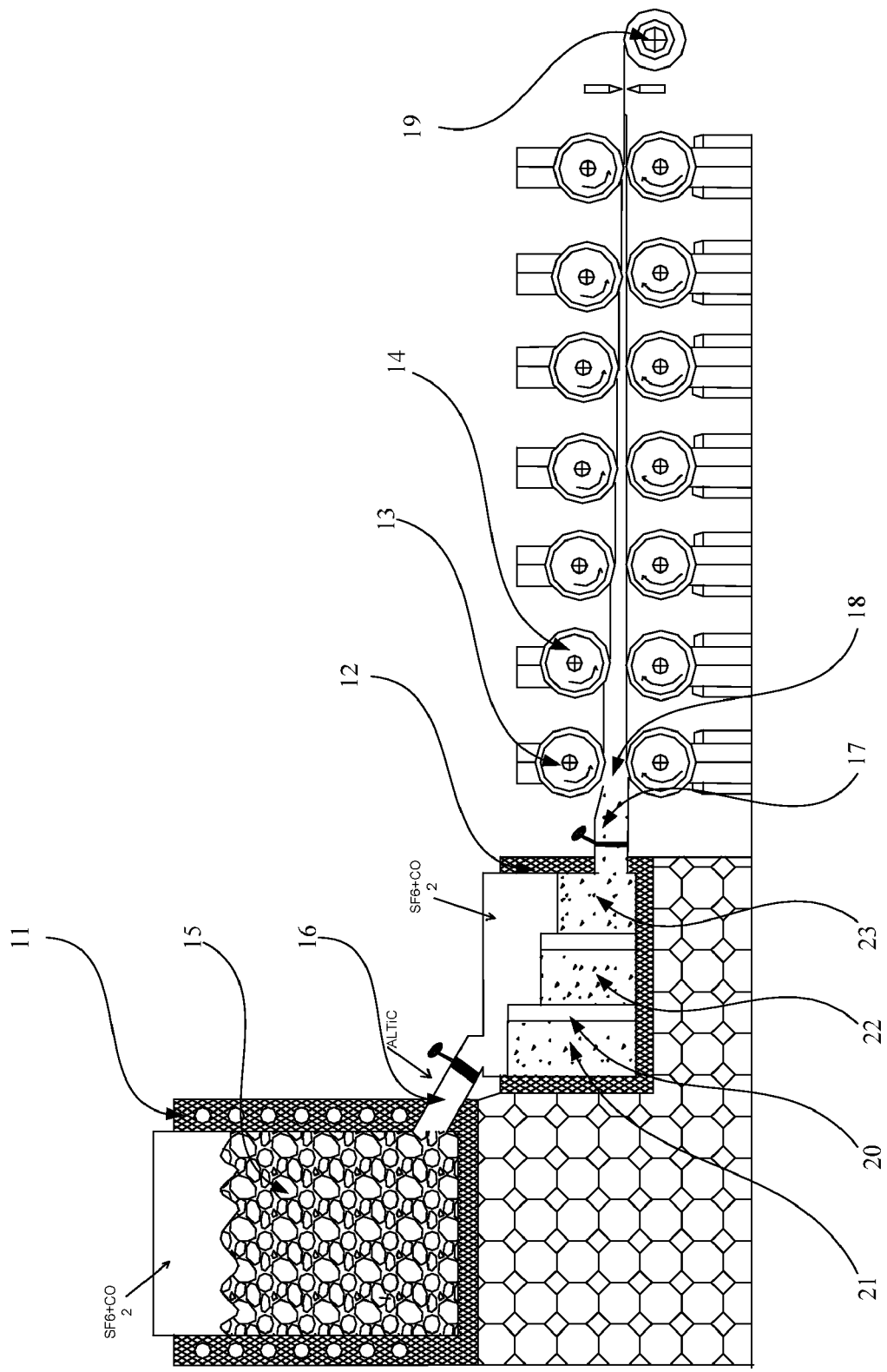
FIG. 1 is a schematic showing a method for continuous and efficient casting roll of magnesium alloy plates according to one embodiment of the present invention.
Figure 2:
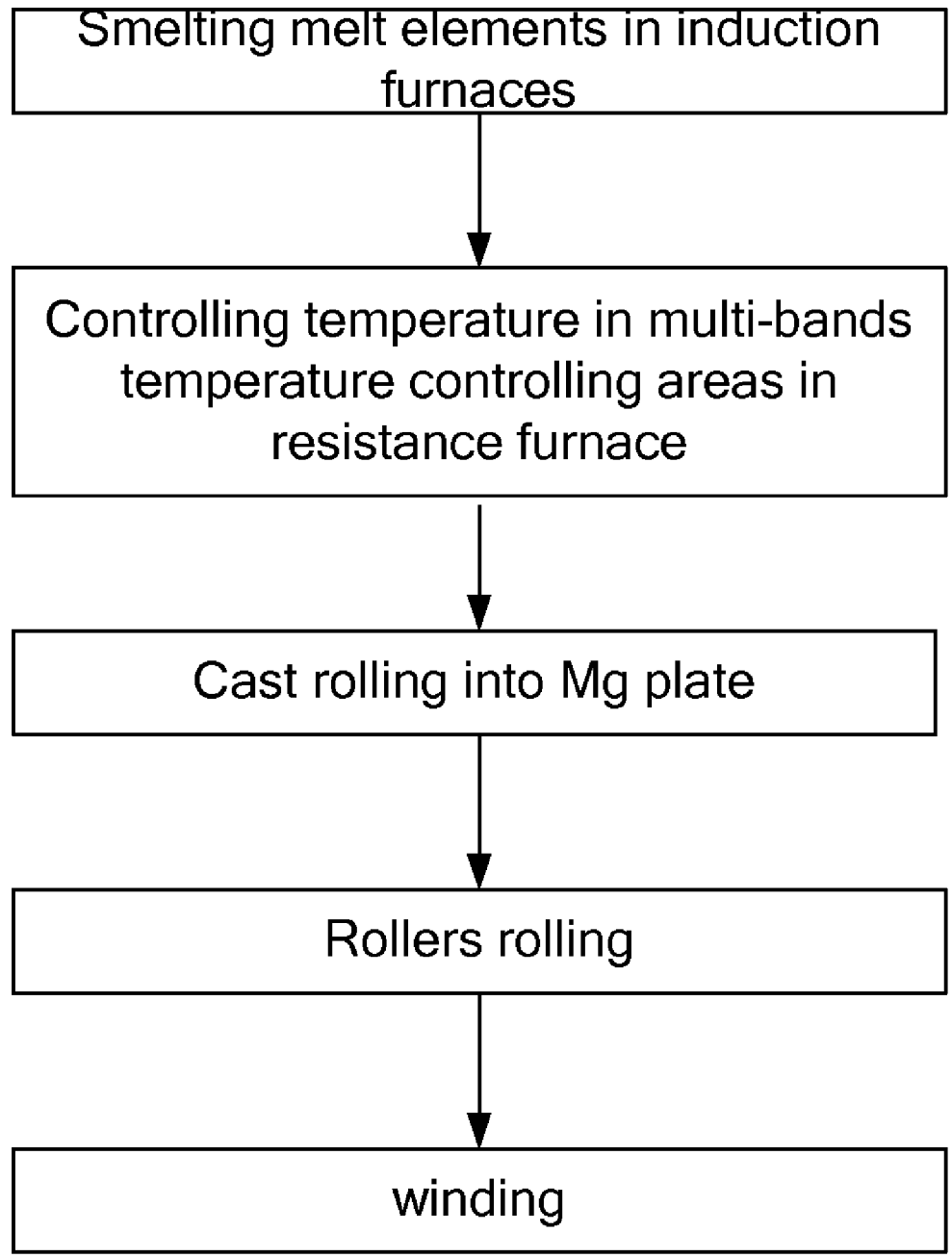
FIG. 2 is a flow chart showing the method for continuous and efficient casting roll of magnesium alloy plates.

Referring to FIGS. 1-2, a method for continuous and efficient casting roll of magnesium alloy plates according to an exemplary embodiment of the present invention includes an induction furnace 11, a resistance furnace 12, a casting roller 13 and a plurality of rollers 14. The induction furnace 11 is configured to melting Mg ingot putted into the induction furnace 11. The Mg melt from the induction furnace 11 flows into the resistance furnace 12 through a pipeline 16. The resistance furnace 12 defines at least two temperature controlling areas with overflow valves connected to each other. The temperature controlling areas have a constant difference in temperature and the temperatures of each one of the temperature controlling areas are set in a consequence from high to low. The Mg melt from the furnace 12 then flows into a biting area 18 through a transferring pipe 17, and forms into an Mg alloy plate. The Mg melt has a temperature at about 690±10° C. The Mg alloy plate goes through the rollers 14 sequentially. The rollers 14 and the Mg alloy plate each has a surface temperature at about 250~350° C., and a temperature difference is about ±10° C. upward along a axis of the roller 14.

In the illustrated embodiment, by adopting the induction furnace 11, a period of Mg smelting time is extensively decreased from hours to no more than one hour, and a output time of the Mg alloy plate since process is correspondingly reduced. The induction furnace 11 is an intermediate frequency furnace. The plural temperature controlling areas effectively improved a precision of controlling on temperatures compared to traditional resistances furnace having single cavity. In the illustrated embodiment, the Mg alloy plates have an improved continuity under the cast rolling mold temperature 690±10° C. The rollers 14 and the Mg alloy plate each maintains a temperature at about 250~350° C. and the Mg alloy plates have an improved plasticity incorporated with a crystal grain refinement of the Mg alloy plates.

In order to be convenient for package and transportation, the Mg alloy plates outputted from the rollers 14 are winded by a winder 19.

Because the Mg melt is active, the induction furnace 11 and the resistance furnace 12 have protection gas therein. The protection gas is distributed above surfaces of Mg melt of the induction furnace 11 and the resistance furnace 12 respectively avoiding the Mg melt contacting oxygen. The induction furnace 11 and the resistance furnace 12 are operated under condition of sealing. Furnace covers are disposed at entrances of the induction furnace 11 and the resistance furnace 12, respectively. Particularly when the Mg melt are fully outputted from the induction furnace 11 and the induction furnace 11 becomes empty, the furnace cover of the induction furnace 11 is opened, and the Mg ingots are putted therein in order to avoid the Mg melt being in touch with oxygen or water. In addition, for a purpose of observing conditions of Mg melt conveniently, the furnace covers are preferably have observation holes configured therein. In the illustrated embodiment, the protection gas can be mixture of $SF_6$ and $CO_2$.

The resistance furnace 12 has a plurality of spacers 20 disposed therein and arranged in the order from high to low, thereby defining the plural temperature controlling areas. The temperature controlling areas are communicated with each other through spaces above the spacers 20. An amount of the temperature controlling areas can be 2, 3, 4, 5 or more. When there are two temperature controlling areas, the amount of the spacers 20 is one. When there are three temperature controlling areas, the amount of the spacers 20 is two, and so forth. The following description takes three temperature controlling areas for example.

The temperature controlling areas includes a first temperature controlling temperature area 21, a second temperature controlling temperature area 22 and a third temperature controlling area 23. The first temperature controlling area 21 has a temperature range scope of 900~800° C. The second temperature controlling area has a temperature range scope of 800~700° C. The third temperature controlling area has a temperature set t 700° C. However, a gradation of the temperature is set in accordance with the amount of the temperature controlling areas. The Mg melt from the induction furnace 11 flows into the first temperature controlling area 21. The Mg melt then overflows into the second temperature controlling area 22, and the overflows into the third temperature 23. The temperature of the Mg melt is adjusted from 900° C. to 800° C., and then 700° C., and finally 690±10° C.

In order to make the temperature of the Mg melt maintains constant in each temperature controlling area, the temperature controlling areas each have a heat resistance unit, a radiation unit and a mixing unit. The heat resistance unit is configured to provide heat energy to the Mg melt. The radiation unit is configured to absorbing heat energy of the Mg melt. The mixing unit is configured to regular the temperatures of the temperature controlling areas. The present invention has also provided a detection unit to detect temperatures of the temperature controlling areas, a control unit to control the range scope of temperature of each temperature controlling area. The control unit is capable of judging a temperature compensation of each temperature controlling area according to a detected temperature signal, and then sending a control signal to the heat resistance unit or the radiation unit. When a detected temperature signal corresponds to a temperature greater than a pre-determined temperature, the heat resistance unit stops providing heat energy, and the radiation unit reduces the temperature down to the pre-determined temperature. When a detected temperature signal corresponds to a temperature lesser than a pre-determined temperature, the heat resistance provides heat energy to the temperature controlling areas until the actual temperature up to the pre-determined value. In the illustrated embodiment, an inside wall of the resistance furnace 12 is made of iron which can conduct heat quickly, therefore the radiation unit is preferably using air cooling. The heat resistance unit can be a heater strip and a ceramic tube outside the heater strip. The heat resistance unit is disposed part of the temperature controlling areas with a distribution density adapted to volumes of the temperature controlling areas and efficiency of the radiation unit. In the illustrated embodiment, at least one of the temperature controlling areas has the mixing unit to mix the Mg melt therein so as to make the metal elements distributed uniformly. At least another one of the temperature controlling areas controls a height and steady of the surface of the Mg melt. The Mg melt is transferred to the biting area 18 through the transferring pipe 17.

The Mg melt is adjusted with the pre-determined temperature and then transferred to the biting area 18 through the transferring pipe 17. The transferring pipe 17 is preferably disposed adjacent to a bottom of the third temperature controlling area 23. The transferring pipe 17 has a valve disposed therein which is configured to allow or block the Mg melt to pass through.

Because Mg is of poor plasticity, the present invention provides an entrance of crystal grain refinement agents at pipe 16 such that the Mg plates can be refined. The present invention employs Al—Ti—C for crystal grain refinement.

The rollers 14 and the Mg alloy plate each maintains a temperature at about 250~350° C. and the Mg alloy plates have an improved plasticity incorporated with a crystal grain refinement of the Mg alloy plates. The temperatures of the rollers 14 are adjusted by a temperature module disposed adjacent to rolling area. The temperature module includes sections of heating, cooling, detecting to precisely adjust temperatures of different positions. The temperature module has adjusting gradations of 2, 3. 4. 5. 6. 7. 8. 9, which can be determined according to specifications of Mg plates.

The present invention includes providing at least two induction furnaces 11, each connecting to the resistance furnace 12 through the pipe 16, and the valve. When performing casting roll process, each induction furnace 11 alternatedly communicated with the resistance furnace 12. The Mg melt of the induction furnace 11 communicated with the resistance furnace 12 flows out completely and then the induction furnace 11 is not communicated by close the valve, and the other induction furnace 11 is communicated with the resistance furnace 12. The former induction furnace 11 has Mg ingots putted therein again when the furnace is cooled. By adopting two induction furnaces 11 to provide Mg melt without interruption, the Mg melt can be of uninterruptible supplement. In other alternative embodiments, the amount of the induction furnaces 11 can be 3 or more.

Comparing to conventional methods, the method for continuous and efficient casting roll of magnesium alloy plates of this invention employs induction furnaces for smelting Mg ingots, and the smelting efficiency has been extensively improved and the problem of slow formation of the Mg melt has been solved. Further more, by gradient controlling of temperatures of the Mg melt to ensure the temperature of the Mg melt into the biting area is at 690±10° C., the plasticity and steady of the Mg melt are greatly improved. Each one of the temperature controlling areas can communicated with each other to avoiding a possibility of blockage of pipelines, and substantially improved the reliability. In addition, continuous and efficient casting roll can form the Mg plates meeting desired specifications.

One embodiment of the present invention is descried as follows.

In structure, the induction furnace, the pipeline, the resistance furnace and the transferring pipe integrated with the resistance furnace are cooperated under protection gas to perform smelting, refinement, crossing, temperature controlling and transferring. In order to allow operators to manipulate conveniently, light transmissions holes and observation holes are disposed at tops and sides of the induction furnaces and the resistance furnace. Furthermore, a flow controller is installed thereof to control a flow rate of the protection gas flowing into the furnaces, a pressure detector to detect a pressure of the protection gas in the furnaces and a silicon controlled temperature controller to control a temperature inside the furnaces.

In process, according to a weight and a specification of the Mg ingots adding grain refiners (Al—Ti—C). For example, the Al—Ti—C that added into Mg ingots is in a proportion of 8~10‰ of the Mg ingots After adding the grain refiner, the Mg alloy plates have much more refined crystal grains, and have an improved plasticity.

In process, metal elements including Mg ingots and Mg alloy have a series processes including smelting, refinement, drossing, and temperature controlling. The induction furnaces and the resistance furnaces have protection gas, such like $SF_6$ and $CO_2$. The protection gas has a thickness of 8~15 cm, which can separate the Mg melt and the oxygen in the furnaces, therefore greatly improves a safety of the fabrication.

In process, casting roll and 6 grads temperatures rollers have lubricants disposed on surfaces to prevent an oxidative combustion of the Mg alloy. The lubricants on the surfaces of the rollers includes suspending liquid containing 2-3% magnesium hydroxide (MgOH), 0.3% alkyl sodium sulfonate, 1% potassium fluoborate and water.

The steps of the present invention are described as follows.

Step 1: adding metal elements into the induction furnaces. The Mg ingots are putted into the induction furnaces. Al, Zn, Mn, Ce, Th, zirconium and Ge alloy elements are putted into the induction furnaces. The furnace covers are closed, the furnaces are sealed. The protection gas are supplied into the furnaces before heating or before the temperature of the furnaces below 620° C. The valve for controlling the protection gas is opened, and the protection gas of SF6 and CO2 mixture are filled into the induction furnaces, such that it can avoid the Mg melt to contact the oxygen.

The mental elements then are smelted, and through refinement and slagging-off. Then the Mg melt is stirred to make the Mg melt distributed uniformly.

When one of the induction furnaces is to be used, to activate the temperature module connected thereto to raise the temperature to the pre-determined value such that a condensation block can be avoided. When the temperature is up to the set value, open the valve and the Mg melt flows into the resistance furnace through the pipeline. The grain refiners are added through the entrance of the refinement when the valve is opened.

Step 2: Precisely controlling temperature in the resistance furnace. After the Mg melt flow into the resistance furnaces, the Mg melt are stored in the first temperature controlling area until the melt height reaching the height of the spacer between the first temperature controlling area and the second temperature area. Then the Mg melt overflows into the second temperature controlling area, and then overflows into the third temperature controlling area and so on. In order to make the temperature of the Mg melt maintains constant in each temperature controlling area, the temperature controlling areas each have a heat resistance unit, a radiation unit and a mixing unit. The heat resistance unit is configured to provide heat energy to the Mg melt. The radiation unit is configured to absorbing heat energy of the Mg melt. The mixing unit is configured to regular the temperatures of the temperature controlling areas. The present invention has also provided a detection unit to detect temperatures of the temperature controlling areas, a control unit to control the range scope of temperature of each temperature controlling area. The control unit is capable of judging a temperature compensation of each temperature controlling area according to a detected temperature signal, and then sending a control signal to the heat resistance unit or the radiation unit. When a detected temperature signal corresponds to a temperature greater than a pre-determined temperature, the heat resistance unit stops providing heat energy, and the radiation unit reduces the temperature down to the pre-determined temperature. When a detected temperature signal corresponds to a temperature lesser than a pre-determined temperature, the heat resistance provides heat energy to the temperature controlling areas until the actual temperature up to the pre-determined value.

When the temperature controlling area before the transferring pipe has reached the set temperature and volume, the outside temperature module is activated and the transferring pipe and the valve are controlled to be of the set temperature. Then the Mg melt is transferred through the transferring pipe.

In this step, the resistance furnace is sealed and with protection gas filled therein.

Step 3: Casting roll the Mg alloy plates. The Mg melt are transferred to the biting area through the transferring pipe. To prevent the casting roll and the Mg melt become viscous, and to prevent the oxidative combustion, the lubricants on the surfaces of the rollers including suspending liquid containing 2~3% magnesium hydroxide (MgOH), 0.3% alkyl sodium sulfonate, 1% potassium fluoborate and water are provided. The upper roller and the lower roller are rolling toward opposite directions and the cooling liquid thereof flowing in and out without interruption.

Step 4: Plural rollers rolling Mg alloy plates. The Mg melt after casting roll are outputted into 6 grads temperature roller. The upper and lower rollers has surface temperature at about 250~350° C., and the difference of temperature is ±10° C. The 6 grads temperature rollers each have a vertical distance of the upper roller and the lower roller, which decides the thickness of the Mg alloy plates. When Mg alloy plates enters into the first band of upper and lower rollers, the upper and lower rollers rolling toward different directions and the thickness of the plate is 7~8 mm. Then the Mg alloy plate is into the second band of upper and lower rollers, and the thickness becomes 3~4 mm, and then into the third, fourth, and so. After the sixth band of upper and lower roller, the thickness of the Mg alloy plate is 0.1~0.2 mm.

| | roller | | | | | |
|---|---|---|---|---|---|---|
| | 1 | 2 | 3 | 4 | 5 | 6 |
| Thickness compress rate | 7-8 | 3-4 | 1.5-2 | 0.7-1 | 0.3-0.5 | 0.1-0.2 |

It is to be understood, however, that even though numerous characteristics and advantages of exemplary and preferred embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for continuous and efficient casting roll of magnesium alloy plates comprising:
   providing plural induction furnaces, a resistance furnace, a casting roll and rollers;
   adding metal elements into the induction furnaces, the metal elements comprising Mg ingots or Mg alloy, the metal elements being smelted in the induction furnaces and then flow into the resistance furnace;
   controlling a temperature of the Mg melt in the resistance furnace, wherein there are at least two temperature controlling areas communicated with each other, and a difference of temperature is constant;
   transferring the Mg melt into a biting area through a transferring pipe and modeling the Mg melt into Mg plate, the temperature of the Mg melt into the biting area being 690±10° C.; and rolling the Mg plate in the rollers and each band of the rollers having a working temperature 250~350° C., and a difference of temperature between the each band of the rollers is ±10° C., wherein the resistance furnace has at least one spacer disposed therein, thereby defining the at least two temperature controlling areas and arranged in an order from a temperature controlling area with a highest temperature to a temperature controlling area with a lowest temperature in a direction of the Mg melt casting.

2. The method for continuous and efficient casting roll of magnesium alloy plates as claimed in claim 1, wherein the Mg plate is winded after rolling.

3. The method for continuous and efficient casting roll of magnesium alloy plates as claimed in claim 1, wherein the metal elements are smelted in the induction furnaces, and through refined, slagging-off and then stirred.

4. The method for continuous and efficient casting roll of magnesium alloy plates as claimed in claim 1, wherein the induction furnaces and the resistance furnaces have protection gas disposed therein.

5. The method for continuous and efficient casting roll of magnesium alloy plates as claimed in claim 4, wherein the protection gas is mixture of $SF_6$ and $CO_2$.

6. The method for continuous and efficient casting roll of magnesium alloy plate as claimed in claim 1, wherein the temperature controlling areas are being communicated with each other through space above the at least one spacer.

7. The method for continuous and efficient casting roll of magnesium alloy plates as claimed in claim 6, wherein the temperature controlling areas each comprise a heat resistance unit, a radiation unit and a mixing unit, the heat resistance unit being configured to provide heat energy to the Mg melt, the radiation unit being configured to absorbing heat energy of the Mg melt, the mixing unit being configured to regular the temperatures of the temperature controlling areas, further comprising a detection unit to detect temperatures of the temperature controlling areas, a control unit to control the range scope of temperature of each temperature controlling area, the control unit being capable of judging a temperature compensation of each temperature controlling area according to a detected temperature signal, and then sending a control signal to the heat resistance unit or the radiation unit, when a detected temperature signal corresponding to a temperature greater than a pre-determined temperature, the heat resistance unit stopping providing heat energy, and the radiation unit reducing the temperature down to the pre-determined temperature, when a detected temperature signal corresponding to a temperature lesser than a pre-determined temperature, the heat resistance providing heat energy to the temperature controlling areas until the actual temperature up to the pre-determined value.

8. The method for continuous and efficient casting roll of magnesium alloy plates as claimed in claim 7, wherein side walls of the temperature controlling areas are made of iron, the heat resistance unit being a heater strip and a ceramic tube outside the heater strip.

9. The method for continuous and efficient casting roll of magnesium alloy plates as claimed in claim 6, wherein an amount of the temperature controlling areas is 2, 3, 4, or 5.

10. The method for continuous and efficient casting roll of magnesium alloy plates as claimed in claim 6, wherein the temperature controlling areas comprises a first temperature controlling area of 900~800° C., a second temperature controlling area of 800~700° C. and a third temperature controlling area of 700° C.

11. The method for continuous and efficient casting roll of magnesium alloy plates as claimed in claim 10, wherein the transferring pipe is disposed adjacent to the third temperature controlling area.

12. The method for continuous and efficient casting roll of magnesium alloy plates as claimed in claim 1, wherein the transferring pipe has a valve disposed therein which is configured to allow or block the Mg melt to pass through, the temperatures of the rollers being adjusted by a temperature module disposed adjacent to rolling area.

13. The method for continuous and efficient casting roll of magnesium alloy plates as claimed in claim 12, wherein the transferring pipe has an entrance for crystal grain refiners.

14. The method for continuous and efficient casting roll of magnesium alloy plates as claimed in claim 1, wherein a temperature module is disposed adjacent to the rolling area.

15. The method for continuous and efficient casting roll of magnesium alloy plates as claimed in claim 1, wherein an amount of the induction furnaces is two or more, the induction furnaces being alternately connected to the resistance furnace.

* * * * *